United States Patent
Stadler et al.

[15] 3,674,694
[45] July 4, 1972

[54] MANGANESE ZINC-FERRITE CORE

[72] Inventors: Georg Stadler, Balanstrasse 103, 8000 Munich 90; Erwin Vogg, Mitlenwaldstrasse, 8000 Munich 55, both of Germany

[73] Assignee: Siemens Aktiengesellschaft Berlin and Munich

[22] Filed: April 5, 1971

[21] Appl. No.: 131,555

Related U.S. Application Data

[63] Continuation-in-part of Ser. No. 819,034, April 24, 1969, abandoned.

[30] Foreign Application Priority Data

May 17, 1968 Germany ..................P 17 71 398.3

[52] U.S. Cl. ..................252/62.59, 252/62.62, 252/62.63
[51] Int. Cl. ........................................................C04b 35/38
[58] Field of Search ........................252/62.59, 62.62, 62.63

[56] References Cited

UNITED STATES PATENTS

| | | | |
|---|---|---|---|
| 2,961,407 | 11/1960 | Piekarski | 252/62.62 |
| 3,055,833 | 9/1962 | Baltzer | 252/62.62 X |
| 3,415,751 | 12/1968 | Hirota et al. | 252/62.62 X |
| 3,492,236 | 1/1970 | Ross | 252/62.62 X |
| 3,565,806 | 2/1971 | Ross | 252/62.62 |
| 3,567,641 | 3/1971 | Ross | 252/62.59 |
| 3,574,116 | 4/1971 | Sugano et al. | 252/62.59 |

FOREIGN PATENTS OR APPLICATIONS

| | | | |
|---|---|---|---|
| 1,422,534 | 1/1965 | France | 252/62.62 |

*Primary Examiner*—Tobias E. Levow
*Assistant Examiner*—J. Cooper
*Attorney*—Hill, Sherman, Meroni, Gross & Simpson

[57] ABSTRACT

A manganese-zinc ferrite core having an essentially linear relation between permeability and temperature over the temperature zone ranging from about −40° C. to about +60° C. and being composed of starting material of about 50 to 55 mol percent of $Fe_2O_3$, about 23 to 35 mol percent of MnO, about 10 to 25 mol percent of ZnO, up to 3 mol percent of $TiO_2$, about 0.02 to 0.2 percent by weight of CaO and about 0.05 to 1 percent by weight NiO.

3 Claims, 1 Drawing Figure

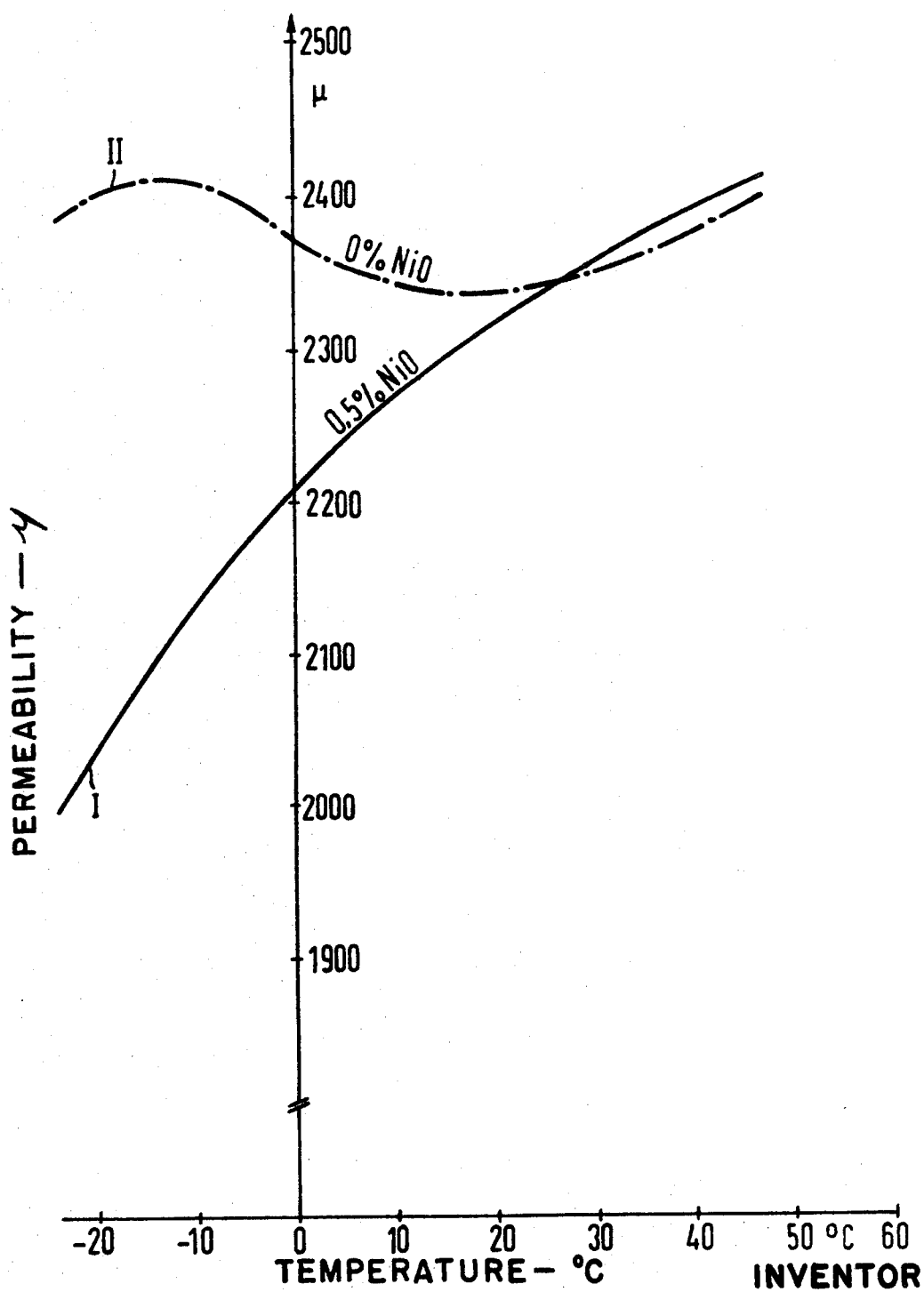

MANGANESE ZINC-FERRITE CORE

CROSS-REFERENCE TO RELATED APPLICATION

This is a continuation-in-part application of U.S. Ser. No. 819,034 filed Apr. 24, 1969 now abandoned and incorporated herein by reference.

BACKGROUND OF THE INVENTION

1. Field Of The Invention

The invention relates to ferromagnetic cores and more particularly to manganese-zinc ferrite cores having a substantially linear relation between permeability and temperature over a relatively wide operating temperature zone.

2. Prior Art

Manganese-zinc ferrite cores are widely used in resonance circuits and filters, such as contained in a variety of electrical equipment, for example radios. These ferrite cores are used in conjunction with a coil to vary the conductance and resonance frequency which is also dependent upon capacitance. The capacitance has a negative temperature coefficient and therefore inversely varies with the temperature.

Manganese-zinc ferrite cores are utilized as an inductive component of a resonance circuit or as a filter since they are characterized by high initial permeability, small instability in respect to time and small losses. However, known manganese-zinc ferrites generally have a more or less pronounced secondary permeability maximum that strongly effects the relation between permeability and temperature over a temperature zone of about −40° C. to +60° C. In many instances, changes in permeability of such cores with temperature produces random non-orderly permeability value at various points over an operating temperature range. Of course such fluctuations of the temperature coefficient cause erroneous compensations in, for example, a resonance circuit.

Accordingly, it would be extremely desirable to provide a manganese-zinc ferrite core which is characterized by an essentially linear relation between permeability and temperature. This linear relation would compensate for the negative linear characteristics of capacitance, whereupon resonance frequencies would be maintained constantly. Accordingly, it is an object of the invention to provide a manganese-zinc ferrite core having such characteristics so as to be useful, for example, in resonance filters.

SUMMARY OF THE INVENTION

A CaO-containing manganese-zinc ferrite core characterized essentially by a linear relationship between permeability and temperature over a temperature zone ranging from about −40° C. to about +60° C. The starting materials for the ferrite cores of the invention have a composition of about 50 to 55 mol percent of $Fe_2O_3$, about 23 to 35 mol percent of MnO, about 10 to 25 mol percent of ZnO, up to 3 mol percent of $TiO_2$, about 0.02 to 0.2 percent by weight of CaO and about 0.05 to 1 percent by weight of NiO.

A method of forming the instant cores comprise mixing appropriate amounts of $Fe_2O_3$, $Mn_2O_3$ (or $MnCO_3$) and ZnO, presintering the resultant mixture at a temperature of about 900° C. to 1,100° C., adding appropriate amounts of $TiO_2$, CaO (or $CaCO_3$) and $Ni_2O_3$ to the resultant mixture and wet-grinding the resultant mass until a substantially homogeneous mixture results. This homogeneous mixture is formed, as by pressing, into ferrite cores of a desired shape, such as ring cores or bowl cores and decarbonizing in a conventional manner. Thereafter, the cores are heated within 5 to 20 hours to a sintering temperature of about 1,250° to 1,350° C. and sintered at this temperature for 2 to 5 hours in a gravity-discharge furnace provided with an oxygen-nitrogen atmosphere containing 1 to 10 percent by volume of oxygen. The sintered cores are cooled within 3 to 10 hours to room-temperature in an oxygen-nitrogen atmosphere containing less than 0.02 percent by volume of oxygen. The sintering temperature, the composition of the atmosphere and the rates of heating and/or cooling depends mostly on the size and shape of the cores to be sintered and on the size and shape of the gravity-discharge furnace.

BRIEF DESCRIPTION OF THE DRAWING

The FIGURE is a graphic illustration of the linear dependency of permeability to temperature in a typical embodiment or of the invention, as compared to a prior art core of somewhat similar composition.

DESCRIPTION OF THE PREFERRED EMBODIMENTS

The CaO-containing manganese-zinc ferrite cores of the invention are composed of starting materials consisting essentially of:

Composition I:
  50 to 55 mol percent of $Fe_2O_3$
  23 to 35 mol percent of MnO
  10 to 25 mol percent of ZnO
  0 to 3 mol percent of $TiO_2$
  0.02 to 0.2 percent by weight of CaO and
  0.05 to 1 percent by weight of NiO and are characterized by essentially linear relation of permeability to temperature, as well as losses. As a result of the nickel oxide additions, the effect of temperature on the permeability of the CaO-containing manganese-zinc ferrites are greatly altered so that the temperature coefficient of the permeability is affected while the loss factor and the instability as to time factor are not affected. The proper addition of nickel oxide to the CaO-containing manganese-zinc ferrites in accordance with the principles of the invention allows the permeability characteristics of individual resonance circuits and/or filters to be controlled as a function of the operating temperature.

The illustrated graph shows the permeability of CaO-containing manganese-zinc ferrite cores having substantially similar compositions. The solid curve I illustrates the characteristics of an embodiment of the invention composed of starting materials consisting essentially of:

Composition II:
  52.5 mol percent of $Fe_2O_3$
  27.4 mol percent of MnO
  19.5 mol percent of ZnO
  0.6 mol percent of $TiO_2$
  0.1 percent by weight of CaO, and
  0.5 percent by weight of NiO.

The broken curve II illustrates the characteristics of a prior art CaO-containing manganese-zinc ferrite core composed of starting materials of:

Composition III:
  52.5 mol percent of $Fe_2O_3$
  27.4 mol percent of MnO
  19.5 mol percent of ZnO
  0.6 mol percent of $TiO_2$, and
  0.1 percent by weight of CaO.

The above two ferrite starting materials were processed substantially identically in accordance with the following method. The main components, i.e., $Fe_2O_3$, MnO (or $Mn_2O_2$ or $MnCO_3$) and ZnO were mixed with distilled water and wet-ground until a uniform mixture was achieved. This uniform mixture was then heat treated (pre-sintered) at about 900° C. to 1,100° C. and then again wet-ground, either with distilled water or denatured alcohol in a suitable pulvarizing mill, such as a ball mill utilizing steel balls. The appropriate amounts of $TiO_2$, CaO (or $CaCO_3$) and NiO (or $Ni_2O_3$) were added during the grinding process so that a substantially homogeneous mixture resulted. The wet grinding was continued until an average particle size of about 0.5 to 5 $\mu m$ in diameter was attained. Various binders, such as polyvinyl alcohol (about 1 percent by weight) were added and the homogeneous mixture formed into suitably shaped ferrite cores, as by pressing the mixture into ring cores or bowl cores. The cores were then decarbonized in a conventional manner and then sintered, as in a gravity discharge furnace adopted for operation with an airnitrogen atmosphere. The sintered cores were then cooled, placed in an operational environment and their characteristics measured.

As is readily apparent, curve I shows an essentially linear relation of permeability to temperature over an operating temperature zone of about −40° C. to about +60° C. and particularly over the temperature zone of −20° C. to +20° C. In distinction, curve II shows a non-linear relation of permeability and temperature and in fact shows two maximum permeabilities at various specific temperatures, one at about −12° C. and the other somewhere above +60° C. This random or disorderly dependence of permeability on temperature with prior art cores leads to problems of non-compensation of the oppositely opposed linear dependency of capacitance to temperature with accompanying problems of lack of constant resonance frequency and resultant drift in resonance circuits or filters.

In other embodiments of the invention, CaO-containing manganese-zinc ferrite cores are formed from starting material compositions consisting essentially of:

Composition IV:
50 to 55 mol percent of $Fe_2O_3$
23 to 35 mol percent of MnO
10 to 25 mol percent of ZnO
up to 3 mol percent of $TiO_2$
0.02 to 0.2 percent by weight of CaO, and
0.05 to 1.0 percent by weight of NiO.

Studies of additional characteristics of the ferrite cores of the invention having starting material composition substantially identical to that set forth in Composition II and cores having starting material composition substantially identical to that set forth in Composition III are set forth in Table I below.

TABLE I

| Characteristic Value | Without NiO | With 0.5% NiO |
|---|---|---|
| $\mu$ | 2300-2400 | 2300-2400 |
| $(h/\mu^2)$ (20 kHz) | 0.3–0.4 um/MA | 0.3–0.4 um/MA |
| (tan $\delta/\mu$) (100 kHz) | 2.5–3.5·10⁻⁶ | 2.5–3.0·10⁻⁶ |
| $(TK/\mu)$ (−20°–+20° C.) | 0.5–0.3·10⁻⁶/°C. | 1–1.5·10⁻⁶/°C. |
| $(TK/\mu)$ (+20°–+60° C.) | 0.5–0.7·10⁻⁶/°C. | 0.6–0.8·10⁻⁶/°C. |
| $-i_z/\mu$ | 1.3–3·10⁻⁶ | 1–2·10⁻⁶ |

As will be noted, the loss value tan $\delta/\mu$, the instability as to time factor $-i_z/\mu$, the relative hysteresis factor related to the initial permeability $h/\mu^2$, and the permeability value $\mu$ are not materially affected by the addition of nickel oxide. The differences, if any, occur within the known scattering limits resulting from the sintering process.

It will be understood that modifications and variations may be effect without departing from the spirit and scope of the novel concepts of the invention.

We claim as our invention:

1. A CaO-containing manganese-zinc ferrite characterized by an essentially linear dependence of the permeability on temperature in the operating temperature zone ranging between −40° and +60° C wherein the ferrite is composed of a sintered mixture of starting materials consisting essentially of:
50 to 55 mol percent of $Fe_2O_3$
23 to 35 mol percent of MnO
10 to 25 mol percent of ZnO
0 to 3 mol percent of $TiO_2$
0.02 to 0.2 percent by weight of CaO, and
0.05 to 1.0 percent by weight of NiO.

2. A CaO-containing manganese-zinc ferrite as defined in claim 1 wherein said ferrite is composed of a sintered mixture of starting material consisting essentially of:
52.5 mol percent of $Fe_2O_3$
27.4 mol percent of MnO
19.5 mol percent of ZnO
0.6 mol percent of $TiO_2$
0.1 percent by weight of CaO, and
0.05 to 0.5 percent by weight of NiO.

3. A CaO-containing manganese-zinc ferrite as defined in claim 1 wherein the ferrite is composed of a sintered mixture of starting materials consisting essentially of:
52.5 mol percent of $Fe_2O_3$
27.4 mol percent of MnO
19.5 mol percent of ZnO
0.6 mol percent of $TiO_2$
0.1 percent by weight of CaO, and
0.5 percent by weight of NiO.

* * * * *